No. 649,029.  
W. H. WRIGHT.  
APPARATUS FOR TREATING FOOD PRODUCTS.  
(Application filed June 19, 1896.)  
Patented May 8, 1900.
(No Model.)
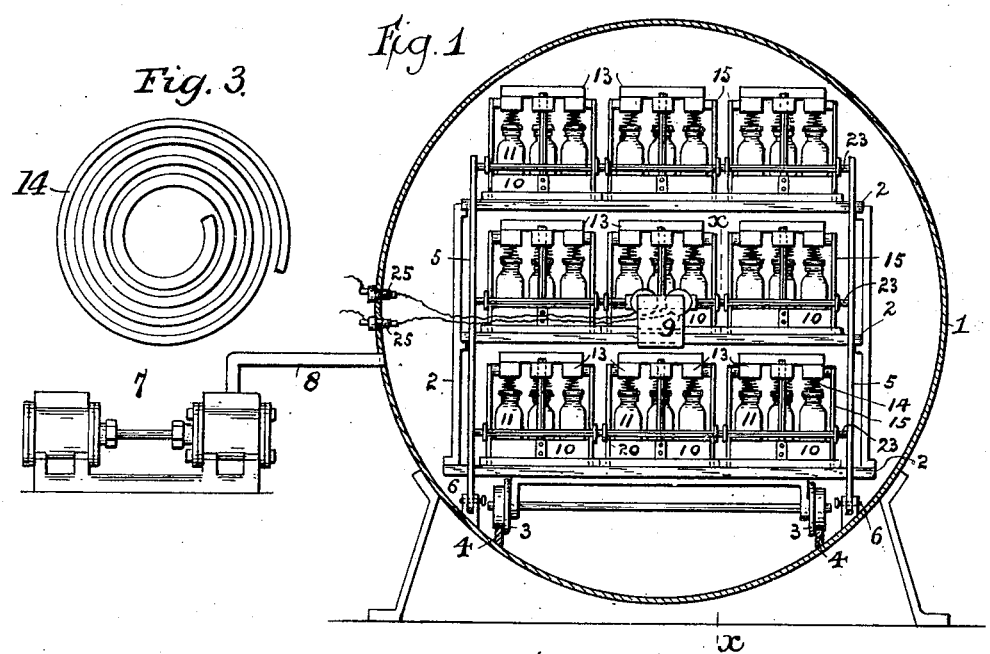
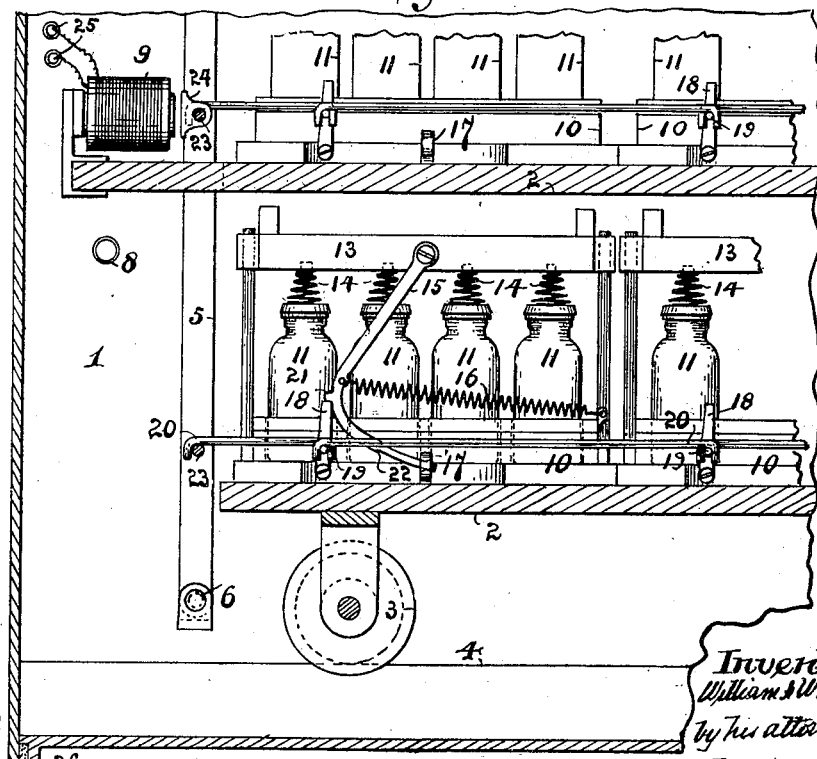

UNITED STATES PATENT OFFICE.

WILLIAM H. WRIGHT, OF NEW YORK, N. Y., ASSIGNOR TO THE VACUUM CAN AND JAR COMPANY, OF SAME PLACE.

APPARATUS FOR TREATING FOOD PRODUCTS.

SPECIFICATION forming part of Letters Patent No. 649,029, dated May 8, 1900.

Application filed June 19, 1896. Serial No. 596,199. (No model.)

*To all whom it may concern:*

Be it known that I, WILLIAM H. WRIGHT, of the city, county, and State of New York, have invented a certain new and useful Improvement in Apparatus for Treating Food Products, of which the following is a specification.

My invention relates to apparatus for treating food products, and has for its object to provide means whereby such food products may be treated in a plurality of vessels or jars contained in a closed receiver and the necessary manipulation or gradation of pressure on the covers of the jars or vessels controlled from without.

In the drawings I have illustrated a form of apparatus embodying the principle of my invention.

Figure 1 is an end elevation view, partly in section; and Fig. 2, an enlarged longitudinal section on line $x\ x$ of Fig. 1, certain parts being broken away. Fig. 3 is a detail of the pressure device or spring.

Like figures of reference refer to like parts throughout the drawings.

Referring to the drawings in detail, 1 represents a receiver in which the treating operation is carried on.

2 is a framework comprising any number of shelves suitably supported and mounted on wheels 3, running on tracks 4 on the inside of the receiver 1.

5 is a framework of ladder-like construction removably pivoted at 6 on both sides of the receiver, on the inside thereof. An air-pump 7, of any desired construction, is connected by pipe 8 to the receiver, being for the purpose of exhausting the receiver at appropriate stages of the treating process, as hereinafter described.

9 is an electromagnet, shown as mounted on one of the shelves of framework 2, and is for the purpose when energized of attracting the pivoted frame 5 to permit the pressure-applying devices to operate instantaneously to apply additional pressure to the covers of the vessels or jars at suitable stages of the treating operation.

10 represents a rack or framework for holding a desired number of vessels or jars 11, containing food products. The rack 10 is provided with a base-piece suitably partitioned for the reception of individual vessels or jars and may have one or more (one being shown in the drawings) posts or standards at each end, upon which slides a top frame 13, on whose lower face are secured a series of springs 14, corresponding in number with the number of vessels which the rack is adapted to contain. On each side of the rack is secured to the upper sliding member thereof a lever 15, adapted to be operated by a spring 16 to work with a cam action in an eye 17 on the base-piece of the rack to apply pressure to the covers of the vessels or jars through the medium of springs 14. Pivoted in recesses on each side of the rack are arms 18, provided with pins 19, projecting on each side, these pins being for the purpose of engaging with link-rods 20, whereby a series of racks are operated in conjunction or simultaneously. The arms 18 are adapted to engage with a projection 21, formed on the cam-levers 15, to retain said levers in position to cause the springs 14 to exert a predetermined degree of pressure on the covers of the vessels or jars during one stage of the treating operation. The levers 15 also have a shouldered portion 22, whereby the movement of the lever through the eyes is limited.

To the rungs 23 of the ladder-like frame 5 are connected the first of a series of link-rods by which the series of racks are connected. Also suitably disposed on said frame 5 is an armature 24.

The manner of treating the food products and the operation of the apparatus will now be described.

Assuming the frame 2 to be outside of the receiver, the shelves are filled with racks containing vessels or jars containing food products to be treated, the levers 15 of each rack being in the position shown in Fig. 2, resting on the arms 18 and causing a comparatively-slight pressure to be exerted on the covers of the jars through the medium of springs 14, these springs being helical in form and graduated from a coil of wire of comparatively-large cross-sectional area and small diameter of spiral to a comparatively-large diameter of spiral and small cross-sectional area of wire, whereby greater difference is obtained between the initial and final pressures. Being in position in the frame 2 and the levers of all the racks being in position to cause an initial pressure to bear on the covers of the jars, as hereinbefore described, the racks are connected by means of link-rods 20 engaging the pins 19 on arms 18. The frame 2 is then moved into the receiver 1, traveling on the rails 4, and the ladder-like frame 5 placed in position (it having been previously removed to permit of the passage of the frame 2 into the receiver) and the electromagnet placed in position and electrically connected to the walls of the receiver, as by sockets 25, whereupon the chamber is hermetically closed, a ring of packing material 26 being shown for this purpose. The receiver may then be partially exhausted of air or the treating process commenced without exhausting at all. Ordinarily in the first stage of the treatment it will not be necessary to attenuate the atmosphere of the receiver. Heat is now applied in any suitable manner to the receiving-chamber to heat the vessels containing the food products. This heating of the contents of the vessels will cause the gases generated thereby and the contained air to expand and be expelled from the vessels, whose covers and superimposed springs act as valves to permit of the escape of the gases. At the desired moment the heating may be discontinued and the air-pumps set in operation to exhaust the atmosphere of the receiver to a higher degree of attenuation, or the exhaustion may be carried on during the preliminary heating. After the desired degree of *vacuo* is reached the electromagnet is energized by throwing it into circuit with a source of electrical energy (not shown) and will attract the armature to draw over the frame 5, (the frame 2 being secured against movement by scotching the wheels or otherwise,) which in turn will draw the connecting link-rods 20 and cause them to release all the cam-levers 15 and allow the springs 16 to draw said levers through the eyes 17 up to the shoulders 22, thus drawing down the upper members of the rack and causing an additional pressure to be exerted on the covers of the jars. This second pressure will be considerably greater than the first pressure, which effect will be emphasized by the graduated construction of the springs 14. A second heating stage is then proceeded with, this second heating being carried to a much higher degree of heat than the first, until the treatment is concluded, whereupon the receiver is opened, the frame 2 removed therefrom, and the racks disconnected. On the opening of the receiver atmospheric pressure on the covers of the vessels will be restored and will act to keep them in place.

What is claimed as new is—

1. A rack for holding one or more jars or vessels, comprising an upper and a lower frame, one or more elastic pressure devices, means for causing said pressure devices to exert an initial pressure on the covers of the jars or vessels, and means for causing an instantaneous relative movement between the upper and lower frames to effect an instantaneous increase in the pressure exerted by the pressure devices.

2. A rack for holding jars or vessels, a set of pressure devices, cam-levers and means coacting therewith for holding said devices down upon the covers of the jars or vessels with an initial pressure, and means for instantaneously releasing said levers, and thereby increasing or raising the pressure of said devices, substantially as described.

3. A rack for holding jars or vessels, a set of pressure devices, movable cam-levers, and means for operating the same tending to exert a final pressure on said pressure devices, means for holding said levers at an intermediate position to exert an initial pressure of the pressure devices upon the covers of the jars or vessels, and means for releasing said levers and thereby increasing or raising the pressure of said devices, substantially as described.

4. A rack for holding jars or vessels, a set of pressure devices, movable cam-levers, and means for operating the same tending to exert a final pressure on said pressure devices, movable arms engaging said levers at an intermediate point of their movement to exert an initial pressure of the pressure devices upon the covers of the jars or vessels, and means for releasing the engagement between said movable arms, and cam-levers, substantially as described.

5. A rack for holding jars or vessels, the same comprising a platform, a sliding frame, guide-posts or standards therefor, and a set of pressure devices, movable cam-levers and means for operating the same tending to exert a final pressure on said pressure devices, means engaging said levers at an intermediate point of their movement to exert an initial pressure of said devices upon the covers of the jars or vessels, and means for instantaneously releasing such engagement, substantially as shown and for the purpose described.

6. A rack for holding jars or vessels, the same comprising a platform, a sliding frame, guide-posts or standards therefor, and a set of pressure devices, movable cam-levers, and means for operating the same tending to exert a final pressure on said pressure devices, means for holding said levers at an intermediate position to exert an initial pressure of the pressure devices upon the covers of the jars or vessels, and means for instantaneously releasing said levers and thereby increasing or raising the pressure of the said pressure devices, substantially as described.

7. A rack for holding jars or vessels, a set of pressure devices, movable cam-levers working in guides and provided with projections and stops, means for operating said levers tending to exert a final pressure on said pressure devices, means for engaging the shoulders on the levers at an intermediate position of the latter to exert an initial pressure of the pressure devices upon the covers of the jars or vessels, and means for releasing such engagement, substantially as described.

8. A rack for holding jars or vessels, a set of pressure devices, movable cam-levers working in guides and provided with stops and shoulders, springs for operating said levers tending to exert a final pressure on said pressure devices, means for engaging the shoulders on the levers at an intermediate position of the latter to exert an initial pressure of the pressure devices upon the covers of the jars or vessels, and means for releasing such engagement, substantially as described.

9. A rack for holding jars or vessels, a set of pressure devices, movable cam-levers working in guides and provided with shoulders and stops, means for operating said levers tending to exert a final pressure on said pressure devices, movable arms engaging the shoulders on the levers at an intermediate position of the latter to exert an initial pressure of the pressure devices upon the covers of the jars or vessels, and means for releasing such engagement, substantially as described.

10. A rack for holding jars or vessels, a set of pressure devices, movable cam-levers working in guides and provided with shoulders and stops, springs for operating said levers tending to exert a final pressure on said pressure devices, movable arms engaging the shoulders on the levers at an intermediate position of the latter to exert an initial pressure of the pressure devices upon the covers of the jars or vessels, and means for releasing such engagement, substantially as described.

11. A rack for holding jars or vessels, a set of pressure devices, movable cam-levers, and means for operating the same tending to exert a final pressure on said pressure devices, movable arms having projecting pins, and engaging said levers at an intermediate point of their movement to exert an initial pressure of the pressure devices upon the covers of the jars or vessels, longitudinal rods engaging the pins on said arms, a hinged frame to which the ends of said rods are connected, and means for swinging the frame outward to release engagement of the movable arms with the levers, substantially as shown and described.

12. A rack for holding jars or vessels, a set of pressure devices, movable cam-levers and springs for operating the same tending to exert a final pressure on said pressure devices, movable arms having projecting pins and engaging said levers at an intermediate position of their movement to exert an initial pressure of the pressure devices upon the covers of the jars or vessels, longitudinal rods engaging the pins on said arms, a hinged frame to which the ends of said rods are connected, and means for swinging the frame outward to release engagement of the movable arms with the levers, substantially as described.

13. A rack for holding jars or vessels, a set of pressure devices, movable cam-levers working in guides and provided with shoulders and stops, springs for operating said levers tending to exert a final pressure on said pressure devices, movable arms having projecting pins and engaging said levers at an intermediate position of their movement to exert an initial pressure of the pressure devices upon the covers of the jars or vessels, longitudinal rods engaging the pins on the said arms, a hinged frame connecting with the ends of said rods, and means for swinging the frame outward to release engagement of the movable arms with the levers, substantially as described.

14. The combination with a receiver capable of being hermetically closed, of a rack for holding jars or vessels, cam-levers and means for operating the same tending to exert a final pressure on said pressure devices, means for engaging said levers at an intermediate position to exert an initial pressure of the pressure devices upon the covers of the jars or vessels, longitudinal rods for releasing such engagement, a hinged gate supported within the receiver and connecting with said rods, and means for swinging the gate outward to operate the rods, substantially as described.

15. The combination with a receiver, capable of being hermetically closed, of a rack for holding jars or vessels, cam-levers and means for operating the same tending to exert a final pressure on said pressure devices, means for engaging said levers at an intermediate position to exert an initial pressure of the pressure devices upon the covers of the jars or vessels, longitudinal rods for releasing such engagement, a hinged gate supported within the receiver and connecting with said rods, and a magnet and armature for swinging said gate outward, substantially as shown and for the purpose described.

16. The combination with a rack for holding jars or vessels, of pressure devices consisting of helical springs graduated from a comparatively-large cross-sectional area and small diameter of spiral, to a comparatively-large diameter of spiral and small cross-sectional area, substantially as described.

In testimony whereof I have signed my name to this specification in the presence of two subscribing witnesses.

WILLIAM H. WRIGHT.

Witnesses:
ERNEST HOPKINSON,
W. LAIRD GOLDSBOROUGH.